May 13, 1924.

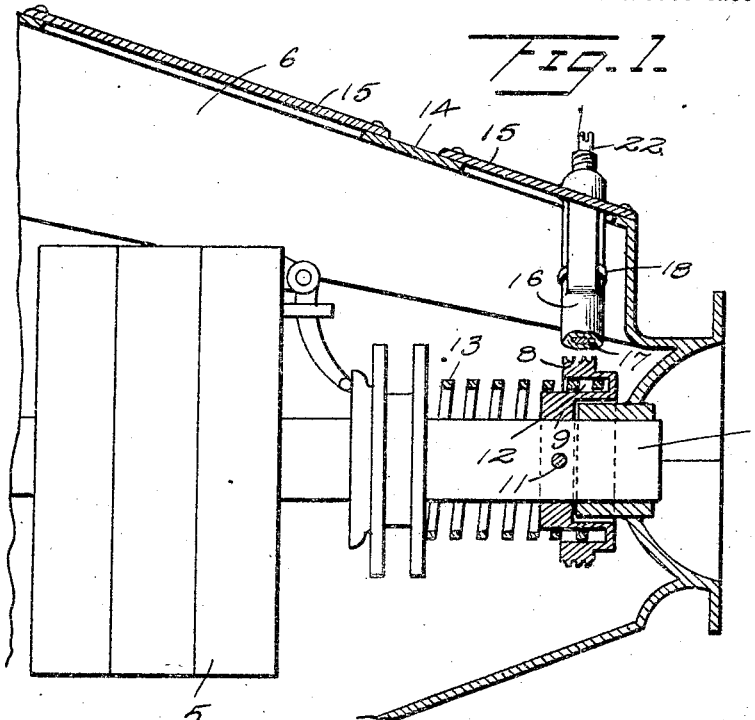
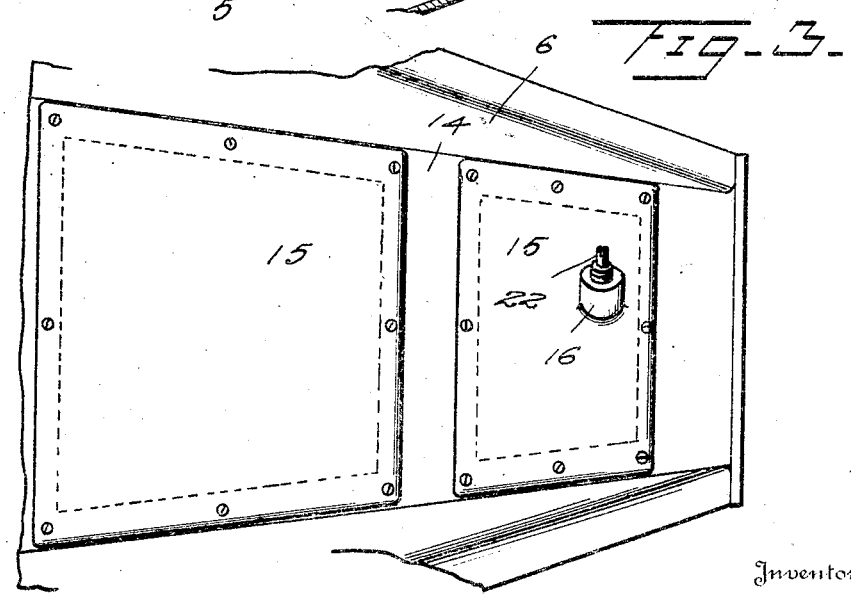

J. C. KIRKHAM 1,493,990

TRANSMISSION SPEEDOMETER FOR AUTOS

Filed July 13, 1922    2 Sheets-Sheet 2

Inventor
J. C. Kirkham.
By William J. Jaelie
Attorney

Patented May 13, 1924.

1,493,990

UNITED STATES PATENT OFFICE.

JAMES C. KIRKHAM, OF CORYDON, INDIANA.

TRANSMISSION SPEEDOMETER FOR AUTOS.

Application filed July 13, 1922. Serial No. 574,812.

*To all whom it may concern:*

Be it known that I, JAMES C. KIRKHAM, a citizen of the United States, residing at Corydon, in the county of Harrison and State of Indiana, have invented certain new and useful Improvements in Transmission Speedometers for Autos, of which the following is a specification.

My invention is a transmission speedometer and is particularly designed for Ford automobiles.

The primary object of the present invention is to provide a simple device to operate a speedometer from the transmission of the automobile.

A further object of the invention is to provide a speedometer operable from the transmission and is so constructed as to eliminate certain of the transmission parts.

Also it is within the provision of the invention to provide a device of this character wherein the same operates in a bath of lubricating oil from the splash of oil from the oil reservoir or pump of the engine and thereby insures proper lubrication and increased wear of the mechanism.

Still another object of the invention is to provide a speedometer which may be installed in any Ford transmission without taking the meter out of the frame or removing the transmission cover.

With the preceding and other objects in view the invention consists in the novel combination of elements, constructions and arrangement of parts in operation to be hereinafter specifically referred to, claimed and illustrated in the accompanying drawing wherein, Figure 1 is a vertical longitudinal sectional view of a Ford transmission embodying my invention;

Figure 3 is a top plan of the device.

Figure 2:
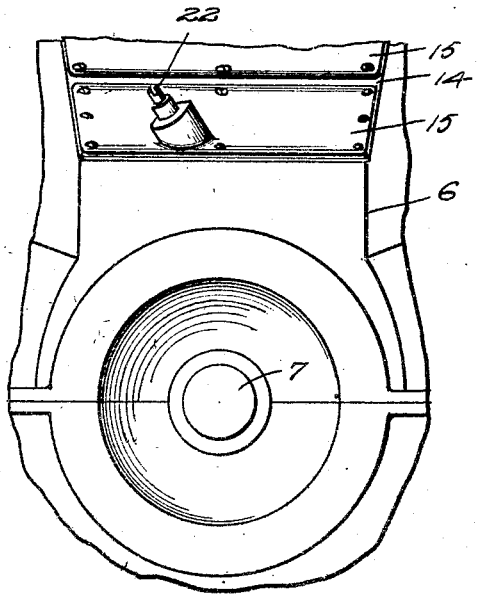
Figure 2 is an end elevation of the same.
Figure 4:
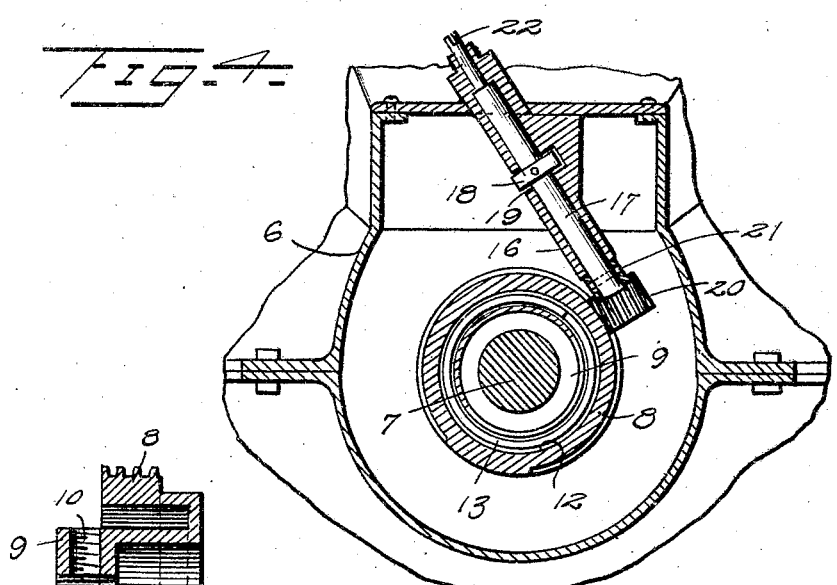
Figure 4 is a vertical transverse sectional view of a driven gear connected with the power shaft from the transmission.
Figure 5:
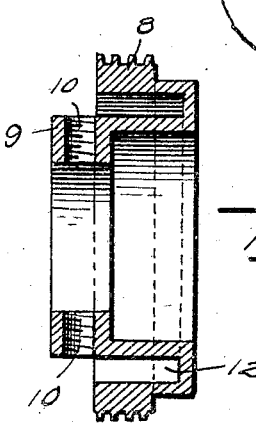
Figure 5 is a detail sectional view of the drive gear.

Referring to the drawings wherein corresponding characters of reference denote corresponding parts throughout the several views, the numeral 5 designates the usual Ford transmission mechanism while 6 denotes the housing therefor. Mounted on the drive shaft 7 is a drive gear 8 formed with a collar 9 having key or pin receiving openings 10 to receive the transverse pin 11 passing transversely through the shaft 7. The front face of the drive gear 8 is provided with a circumferential groove 12 in which one end of the clutch spring designated at 13 is received.

The transmission housing 6 is provided with a removable top 14 in which panels or door sections 15 are removably secured. Connected with one of the plates 15 and passing through the same is a vertically and angularly disposed sleeve or bearing 16 which extends downward to a point in close proximity to the driven gear 8. A stub shaft 17 is journaled in the sleeve or bearing 16 and carried by this shaft 17 is a collar 18 received in a transverse slot 19 in the sleeve or bearing 17. A small worm pinion 20 is secured to the lower end of the shaft 16 by a transverse pin 21 and meshes with the driven worm gear 8. The upper end of the shaft 16 is provided with a coupling 22 connected with the usual flexible driving connection with the speedometer, not shown.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:—

The combination with a transmission mechanism and the housing therefor, the latter being provided with removable closures; of a driven gear operated by the drive shaft of the transmission, an angularly disposed bearing depending from one of said closures, said bearing having a transversely extending slot therein, a shaft journaled in said bearing, a collar on said shaft and receivable in said slot, a pinion carried by the lower end of said shaft and meshing with the driven gear, and means on the upper end of said shaft for connection with a speedometer.

In testimony whereof I affix my signature.

JAMES C. KIRKHAM.